United States Patent
Borchardt et al.

(10) Patent No.: US 9,487,332 B2
(45) Date of Patent: Nov. 8, 2016

(54) STRETCHED FILMS WITH MAINTAINED TEAR RESISTANCE AND METHODS FOR MAKING THE SAME

(71) Applicant: The Glad Products Company, Oakland, CA (US)

(72) Inventors: Michael G. Borchardt, Willowbrook, IL (US); Robert T. Dorsey, Willowbrook, IL (US); Shaun T. Broering, Fort Thomas, KY (US)

(*) Notice: Subject to any disclaimer, the term of this patent is extended or adjusted under 35 U.S.C. 154(b) by 46 days.

(21) Appl. No.: 14/460,783

(22) Filed: Aug. 15, 2014

(65) Prior Publication Data

US 2014/0357826 A1 Dec. 4, 2014

Related U.S. Application Data

(62) Division of application No. 13/218,666, filed on Aug. 26, 2011, now Pat. No. 8,853,340.

(51) Int. Cl.
| | |
|---|---|
| B29C 55/06 | (2006.01) |
| B29C 55/28 | (2006.01) |
| B65D 33/00 | (2006.01) |
| B29C 43/24 | (2006.01) |
| B29D 7/01 | (2006.01) |
| C08J 5/18 | (2006.01) |
| C08L 23/04 | (2006.01) |
| B29C 47/00 | (2006.01) |
| B29C 55/00 | (2006.01) |
| B29K 23/00 | (2006.01) |
| B29L 7/00 | (2006.01) |

(52) U.S. Cl.
CPC .............. B65D 33/00 (2013.01); B29C 43/24 (2013.01); B29C 55/06 (2013.01); B29D 7/01 (2013.01); C08J 5/18 (2013.01); B29C 47/0009 (2013.01); B29C 55/005 (2013.01); B29C 55/28 (2013.01); B29K 2023/0625 (2013.01); B29L 2007/008 (2013.01); C08J 2323/06 (2013.01); C08L 23/04 (2013.01)

(58) Field of Classification Search
None
See application file for complete search history.

(56) References Cited

U.S. PATENT DOCUMENTS

| | | | |
|---|---|---|---|
| 3,248,753 A | | 5/1966 | Kobayashi et al. |
| 3,265,789 A | * | 8/1966 | Hofer .................. B29C 47/8835 264/209.5 |
| 3,517,098 A | * | 6/1970 | Rasmussen ........... B29C 55/065 264/284 |
| 3,737,497 A | | 6/1973 | Hafner et al. |
| 4,116,892 A | | 9/1978 | Schwarz |
| 4,356,221 A | | 10/1982 | Anthony et al. |
| 4,401,427 A | * | 8/1983 | Benoit .................... B31B 19/86 383/8 |
| 4,510,301 A | | 4/1985 | Levy |
| 4,544,721 A | | 10/1985 | Levy |
| 4,677,007 A | * | 6/1987 | Murray .................. B65D 31/00 428/35.2 |
| 4,680,207 A | * | 7/1987 | Murray .................. B29C 55/14 428/349 |
| 4,867,881 A | | 9/1989 | Kinzer |
| 5,414,979 A | * | 5/1995 | Moore .................... B65B 53/00 53/556 |
| 5,458,841 A | * | 10/1995 | Shirrell .................. B29C 55/04 156/229 |

(Continued)

*Primary Examiner* — Jeffrey Wollschlager
(74) *Attorney, Agent, or Firm* — Thomas C. Feix

(57) ABSTRACT

Methods of stretching thermoplastic films in the machine direction include elongating the films in the machine direction without significantly reducing the films' machine-direction tear resistance. In one or more implementations, methods of stretching thermoplastic films include reducing the gauge of the films while substantially maintaining the films' machine-direction tear resistance. The methods can involve uniformly cold stretching the films by stretching the films to a draw of about one hundred and eighty percent, or less, of the films' original length.

20 Claims, 6 Drawing Sheets

(56) References Cited

U.S. PATENT DOCUMENTS

| | | | |
|---|---|---|---|
| 5,514,455 A * | 5/1996 | Michie, Jr. | C08J 5/18 428/220 |
| 6,635,701 B2 | 10/2003 | Tate et al. | |
| 6,953,510 B1 | 10/2005 | Mackay et al. | |
| 6,964,814 B2 | 11/2005 | Fujii et al. | |
| 2001/0008675 A1 * | 7/2001 | Meece | A61F 13/49012 428/103 |
| 2003/0068951 A1 * | 4/2003 | Boggs | B29C 47/0026 442/394 |
| 2006/0243842 A1 * | 11/2006 | Saldana Garcia | B29C 55/065 242/160.4 |
| 2008/0003910 A1 * | 1/2008 | Hughes | A61F 13/15593 442/327 |
| 2008/0085383 A1 * | 4/2008 | Merrill | B29C 55/06 428/29 |
| 2008/0119102 A1 * | 5/2008 | Hughes | A61F 13/15585 442/328 |
| 2008/0178768 A1 | 7/2008 | Breese | |
| 2008/0233375 A1 | 9/2008 | Wright et al. | |
| 2009/0131618 A1 * | 5/2009 | Santillan Diaz de Leon | B29C 55/023 526/348.1 |
| 2009/0233041 A1 | 9/2009 | Rasmussen | |
| 2009/0269566 A1 * | 10/2009 | Eichbauer | B32B 27/32 428/220 |
| 2010/0040875 A1 | 2/2010 | Patel et al. | |
| 2011/0117307 A1 | 5/2011 | Fraser et al. | |
| 2011/0185683 A1 | 8/2011 | Domenech et al. | |
| 2013/0051710 A1 | 2/2013 | Borchardt et al. | |

\* cited by examiner

STRETCHED FILMS WITH MAINTAINED TEAR RESISTANCE AND METHODS FOR MAKING THE SAME

CROSS-REFERENCE TO RELATED APPLICATIONS

This application is a divisional application and claims priority to co-pending U.S. Ser. No. 13/218,666, filed on Aug. 26, 2011, which is herein incorporated by reference in its entirety.

BACKGROUND OF THE INVENTION

1. The Field of the Invention.

The present invention relates generally to thermoplastic films. Specifically, the invention relates to stretched thermoplastic films, and to methods of stretching thermoplastic films.

2. Background and Relevant Art

Thermoplastic films are a common component in various commercial and consumer products. For example, grocery bags, trash bags, sacks, and packaging materials are products that are commonly made from thermoplastic films. Additionally, feminine hygiene products, baby diapers, adult incontinence products, and many other products include thermoplastic films to one extent or another.

The cost to produce products including thermoplastic film is directly related to the cost of the thermoplastic film. Recently the cost of thermoplastic materials has risen. In response, many manufacturers attempt to reduce the amount of thermoplastic film in a given product in order to reduce production costs.

One way manufacturers may attempt to reduce production costs is to stretch the thermoplastic film, thereby increasing its surface area and reducing the amount of thermoplastic film needed to produce a product of a given size. Common directions of stretching include "machine direction" and "transverse direction" stretching. As used herein, the term "machine direction" or "MD" refers to the direction along the length of the film, or in other words, the direction of the film as the film is formed during extrusion and/or coating. As used herein, the term "transverse direction" or "TD" refers to the direction across the film or perpendicular to the machine direction.

Common ways of stretching film in the machine direction include machine direction orientation ("MDO") and incremental stretching. MDO involves stretching the film between pairs of smooth rollers. Commonly, MDO involves running a film through the nips of sequential pairs of smooth rollers. The first pair of rollers rotates at a speed less than that of the second pair of rollers. The difference in speed of rotation of the pairs of rollers can cause the film between the pairs of rollers to stretch. The ratio of the roller speeds will roughly determine the amount that the film is stretched. For example, if the first pair of rollers is rotating at 100 feet per minute ("fpm") and the second pair of rollers is rotating at 500 fpm, the rollers will stretch the film to roughly five times its original length. MDO stretches the film continuously in the machine direction and is often used to create an oriented film.

Incremental stretching of thermoplastic film, on the other hand, typically involves running the film between grooved or toothed rollers. The grooves or teeth on the rollers intermesh and stretch the film as the film passes between the rollers. Incremental stretching can stretch a film in many small increments that are evenly spaced across the film. The depth at which the intermeshing teeth engage can control the degree of stretching. Often, incremental stretching of films is referred to as ring rolling.

To MDO stretch a film, manufacturers commonly heat the film to an elevated temperature and stretch the film in the machine direction. Commonly, manufacturers will stretch the thermoplastic film between approximately 300 to 500 percent of the film's original length or more. Unfortunately, stretching thermoplastic films in the machine direction using conventional methods can weaken the film.

Thermoplastic films have a variety of different strength parameters. For example, the tensile strength of a thermoplastic film is the maximum stress that a film can withstand while being stretched before it fails. Tear resistance of a thermoplastic film is the amount of force required to propagate or enlarge a tear that has already been created in a film. Still further, impact resistance is the force required to puncture a film. Stretching thermoplastic films in the machine direction using conventional methods can reduce the film's machine-direction tear resistance and/or puncture resistance.

The weakening of a film upon stretching may dissuade manufacturers to stretch a film despite the potential material savings. For example, one common use of thermoplastic films is as bags for liners in trash or refuse receptacles. It is desirable to have trash bags with a high tear resistance to help prevent tearing of the trash bag and associated spilling of the contents during disposal thereof. Another common use of thermoplastic films is as flexible plastic bags for storing food items. Similar to trash bags, a high tear resistance in food storage bags can help prevent tearing of the bags and associated spilling or spoiling of food.

Accordingly, there are a number of considerations to be made in thermoplastic films and manufacturing methods.

BRIEF SUMMARY OF THE INVENTION

Implementations of the present invention solve one or more problems in the art with apparatus and methods for stretching films in the machine direction while maintaining the films' machine-direction tear resistance. In particular, one or more implementations of the present invention include machine-direction stretched films, and products formed therewith, that have a maintained machine-direction tear resistance. Additionally, one or more implementations of the present invention include methods of stretching films in the machine direction, while maintaining the films' machine-direction tear resistance.

For example, one implementation of a machine-direction continuously-stretched film can be formed by stretching an un-stretched film. The machine-direction continuously-stretched film can include a thermoplastic material. The stretched film can further include a substantially uniform gauge that is less than about 98 percent of a gauge of the un-stretched film. The stretched film can also include a tear resistance that is at least about 75 percent of a first tear resistance of the un-stretched film.

Additionally, one or more implementations of the present invention include a thermoplastic bag. The thermoplastic bag can include first and second sidewalls including a machine-direction continuously-stretched film formed by stretching an un-stretched film. The first and second sidewalls can be joined along three edges. Also, one or more of the first and second sidewalls can have a machine direction tear resistance that is at least about 75 percent of a first machine-direction tear resistance of the un-stretched film. Furthermore, the one or more of the first and second sidewalls can have a gauge-by-weight that is less than a first gauge-by-weight of the un-stretched film.

In addition to the forgoing, a method for stretching a film of thermoplastic material in a machine direction can involve providing a film of a thermoplastic material with a first machine-direction tear resistance. The method can also involve cold stretching the film continuously in the machine direction at a draw less than about 80 percent. The continuously stretched film can have a second machine-direction tear resistance that is at least about 75 percent of the first machine-direction tear resistance.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
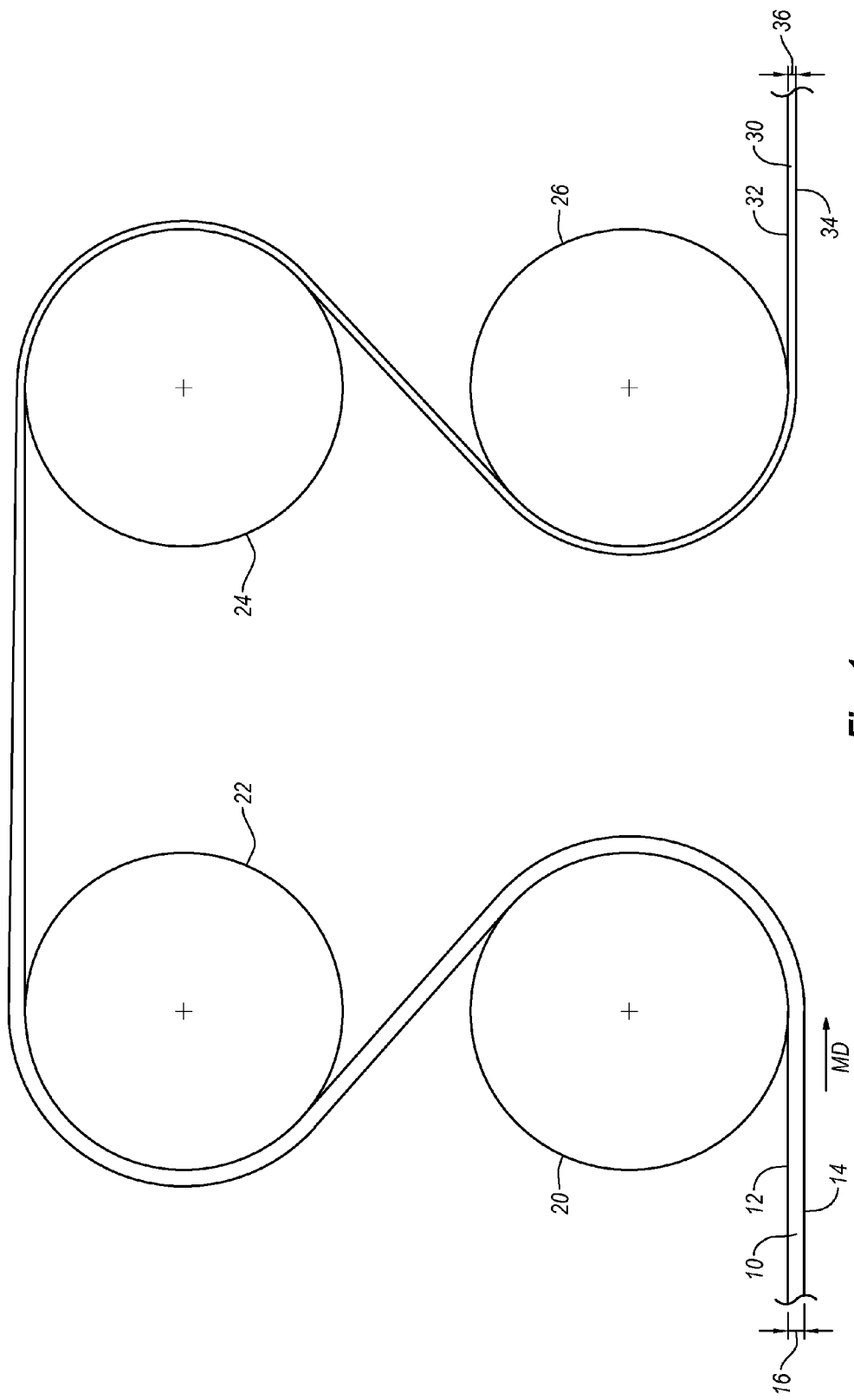
FIG. 1 illustrates a schematic diagram of a thermoplastic film being continuously stretched in the machine direction in accordance with one or more implementations of the present invention.

One or more implementations of the present invention include apparatus and methods for stretching films in the machine direction while maintaining the films' machine-direction tear resistance. In particular, one or more implementations of the present invention include machine-direction stretched films, and products formed therewith, that have a maintained machine-direction tear resistance. Additionally, one or more implementations of the present invention include methods of stretching films in the machine direction, while maintaining the films' machine-direction tear resistance.

Indeed, one or more implementations of the present invention can provide thermoplastic films, and products made there from, with reduced gauge yet maintained tear resistance. Thus, one or more implementations can reduce the material needed to produce a product without compromising important material properties, such as tear resistance. One will appreciate in light of the disclosure herein that such material reductions can provide significant cost savings.

As alluded to previously, one or more implementations include methods of continuously stretching a film in the machine direction with the unexpected result of maintaining the MD tear resistance of the film. In particular, as will be described in greater detail below, one or more implementations provide synergistic effects when cold-stretching thermoplastic films in the machine direction. Indeed, the films of the present invention can undergo one or more film stretching processes under ambient or cold (non-heated) conditions. This differs significantly from most conventional processes that stretch films under heated conditions. Stretching under ambient or cold conditions in accordance with one or more implementations can constrain the molecules in the film so they are not as easily oriented as under heated conditions. This, in combination with by stretching the films to a draw of about 1.8, or less, of the films' original length can provide the unexpected result of maintaining the MD tear resistance of the film.

Film Materials

As an initial matter, the thermoplastic material of the films of one or more implementations can include, but are not limited to, thermoplastic polyolefins, including polyethylene and copolymers thereof and polypropylene and copolymers thereof. The olefin based polymers can include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber.

The examples and description herein below refer to films formed from linear low density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. For example, some examples herein use an octene comonomer, solution phase LLDPE (MI=1.1; ρ=0.920). Additionally, other examples use a gas phase LLDPE, which is a hexene gas phase LLDPE formulated with slip/AB (MI=1.0; ρ=0.920). One will appreciate that the present invention is not limited to LLDPE, and can include "high density polyethylene" (HDPE), "low density polyethylene" (LDPE), and "very low density polyethylene" (VLDPE). Indeed films made from any of the previously mentioned thermoplastic materials or combinations thereof can be suitable for use with the present invention.

Indeed, implementations of the present invention can include any flexible or pliable thermoplastic material which may be formed or drawn into a web or film. Furthermore, the thermoplastic materials may include a single layer or multiple layers. Examples of multilayered films suitable for use with one or more implementations of the present invention include coextruded multilayered films, multiple films continuously laminated together, and multiple films partially laminated together. The thermoplastic material may be opaque, transparent, translucent, or tinted. Furthermore, the thermoplastic material may be gas permeable or impermeable.

In addition to a thermoplastic material, films of one or more implementations of the present invention can also include one or more additives. For examples, the films can include pigments, voiding agents, slip agents, anti-block agents, or tackifiers. The pigments can include $TiO_2$, or other pigments, that can impart a color and/or opacity to the film. Some examples of voiding agents suitable for use in the present invention include calcium carbonate, magnesium carbonate, barium carbonate, calcium sulfate, magnesium sulfate, barium sulfate, calcium oxide, magnesium oxide, titanium oxide, zinc oxide, aluminum hydroxide, magnesium hydroxide, talc, clay, silica, alumina, mica, glass powder, starch, etc. One will appreciate in light of the disclosure herein that the foregoing list of additives are examples of some of the additives that may be suitable for use with the present invention.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

In addition to the foregoing, one will appreciate in light of the disclosure herein that manufacturers may form the films or webs to be used with the present invention using a wide variety of techniques. For example, a manufacturer can form the films using conventional flat or cast extrusion or co-extrusion to produce monolayer, bi-layer, or multi-layer films. Alternatively, a manufacturer can form the films using suitable processes, such as, a blown film process to produce monolayer, bi-layer, or multi-layer films. If desired for a given end use, the manufacturer can orient the films by trapped bubble, tenterframe, or other suitable process. Additionally, the manufacturer can optionally anneal the films thereafter.

In one or more implementations, the films of the present invention are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382; each of which are incorporated herein by reference. Examples of various extruders, which can be used in producing the films to be used with the present invention, can be a single screw type modified with a blown film die, an air ring, and continuous take off equipment.

In a blown film process, the die can be an upright cylinder with an annular opening. Rollers can pull molten plastic upward away from the die. An air-ring can cool the film as the film travels upwards. An air outlet can force compressed air into the center of the extruded annular profile, creating a bubble. The air can expand the extruded circular cross section by a multiple of the die diameter. This ratio is called the "blow-up ratio." When using a blown film process, the manufacturer can collapse the film to double the plies of the film. Alternatively, the manufacturer can cut and fold the film, or cut and leave the film unfolded.

As used herein, the term "starting gauge" or "initial gauge" refers to the average distance between the major surfaces of a film before it is stretched. The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present invention may not be uniform. Thus, the starting gauge of films of one or more implementations of the present invention may vary along the length and/or width of the film.

Referring now to the Figures, FIG. 1 illustrates one exemplary process of continuously stretching a thermoplastic film in the machine direction in accordance with an implementation of the present invention. In particular, FIG. 1 illustrates an MD stretching process that continuously stretches an un-stretched film 10 by passing the un-stretched film 10 through sequential pairs of rollers 20, 22 and 24, 26. As explained in greater detail below, the MD stretching process processes of the present invention can stretch the un-stretched film 10 in the machine direction, while substantially maintaining the MD tear resistance of the un-stretched film 10.

As shown by the Figures, the rollers 20, 22, 24, 26 can each have a generally cylindrical shape. The rollers 20, 22, 24, 26 may be made of cast and/or machined metal, such as, steel, aluminum, or any other suitable material. One or more of the rollers may be coated with a material such as a rubber or urethane to improve gripping of the film and to reduce slippage. The rollers 20, 22 of the first set of rollers can rotate in opposite directions about parallel axes of rotation. For example, FIG. 1 illustrates that the first roller 20 can rotate about a first axis of rotation in a counterclockwise direction. FIG. 1 also illustrates that the second roller 22 can rotate about a second axis of rotation in a clockwise direction. The axes of rotation of the first and second rollers 20, 22 can be parallel to the transverse direction and perpendicular to the machine direction.

Along similar lines, the rollers 24, 26 of the second set of rollers can rotate in opposite directions about parallel axes of rotation. For example, FIG. 1 illustrates that the third roller 24 can rotate about a third axis of rotation in a clockwise direction. FIG. 1 also illustrates that the fourth roller 26 can rotate about a fourth axis of rotation in a counterclockwise direction. The axes of rotation of the third and fourth rollers 24, 26 can be parallel to the transverse direction and perpendicular to the machine direction.

The first set of rollers 20, 22 can rotate at a first velocity, while the second set of rollers 24, 26 rotate at a second velocity that is greater than the first velocity. The difference between the first velocity and the second velocity can cause the un-stretched film 10 to stretch between the first set of rollers 20, 22 and the second set of rollers 24, 26 in the machine direction. The ratio of the speed of the second set of rollers 24, 26 to the first set of rollers 20, 22 is referred to herein as the "draw ratio."

The draw ratio can determine the amount of stretching, or draw, of the un-stretched film 10. For example, a draw ratio of 1.5 (i.e., the second set of rollers 24, 26 rotating at a speed of 1.5 times the speed of the first set of rollers 20, 22) will stretch the un-stretched film 10 to a draw of 1.5. In other words, the un-stretched film 10 will stretch 1.5 times its original length in the MD direction.

One or more implementations include draw ratios between about 1.1 and about 1.8. In other words, one or more implementations include stretching the un-stretched film 10 to a draw of between about 1.1 and about 1.8. As explained in greater detail below, stretching the film in the machine direction with a draw ratio of less than about 1.8 under cold (non-heated) conditions can produce the unexpected result of maintaining the MD tear resistance of the un-stretched film 10.

Thus, the films of the present invention can undergo one or more film stretching processes under ambient or cold (non-heated) conditions to stretch the films to a draw of less than about 1.8. This differs significantly from most conventional processes that stretch films to a draw of greater than 3, and commonly as great as 5, under heated conditions. Stretching under ambient or cold conditions in accordance with one or more implementations can constrain the molecules in the film so they are not as easily oriented as under heated conditions. This, in combination with a draw ratio of less than about 1.8 can provide the unexpected result of maintaining the MD tear resistance of the film.

As shown by FIG. 1, the direction of travel of the un-stretched film 10 through the first set rollers 20, 22 is parallel to the machine direction and perpendicular to the transverse direction. As the un-stretched film 10 passes between the first set of rollers 20, 22 and the second set of rollers 24, 26, the un-stretched film 10 can continuously stretch in the machine direction. Furthermore, in some implementations, stretching the un-stretched film 10 in the machine direction can reduce the width of the un-stretched film 10. For example, as the un-stretched film 10 is lengthened in the machine direction, the film's width can be reduced in the transverse direction.

For example, FIG. 1 illustrates that the un-stretched film 10 (i.e., the film that is yet to pass through the first set of rollers 20, 22 and the second set of rollers 24, 26) can have a substantially flat top surface 12 and substantially flat bottom surface 14. The un-stretched film 10 can have an initial thickness or starting gauge 16 extending between its major surfaces (i.e., the top surface 12 and the bottom surface 14). In at least one implementation, the starting gauge 16 can be substantially uniform along the length of the un-stretched film 10.

For purposes of the present invention, the un-stretched film 10 need not have an entirely flat top or bottom surfaces. Indeed, the top surface 12 and/or the bottom surface 14 can be rough or uneven. Further, the starting gauge 16 need not be consistent or uniform throughout the entirety of un-stretched film 10. Thus, the starting gauge 16 can vary due to intentional product design, manufacturing defects, tolerances, or other processing inconsistencies.

In any event, FIG. 1 illustrates the first set of rollers 20, 22 and the second set of rollers 24, 26 can process the un-stretched film 10 into an MD continuously-stretched film 30. The MD continuously-stretched film 30 can have a substantially flat top surface 32 and substantially flat bottom surface 34. The MD continuously-stretched film 30 can have a thickness or gauge 36 extending between its major surfaces (i.e., the top surface 32 and the bottom surface 34). In at least one implementation, the gauge 36 can be substantially uniform along the length of the MD continuously-stretched film 30.

In one or more implementations, the gauge 36 of the MD continuously-stretched film 30 can be less than the starting gauge 16 of the un-stretched film 10. In other implementations, the gauge 36 of the MD continuously-stretched film 30 can be approximately equal to the starting gauge 16 of the un-stretched film 10. In still further implementations, the gauge 36 of the MD continuously-stretched film 30 can be greater than the starting gauge 16 of the un-stretched film 10 due to rebounding after stretching.

FIG. 1 illustrates that the configuration of the first set of rollers 20, 22 and the second set of rollers 24, 26 can cause the un-stretched film 10 to follow an s-shaped path when passing through the first and second sets of rollers 20, 22, 24, 26. The s-shaped path can provide the tension between the first set of rollers 20, 22 and the second set of rollers 24, 26 necessary to cause the un-stretched film 10 to stretch between the second roller 22 and the third roller 24. One will appreciate in light of the disclosure herein that the first set of rollers 20, 22 and the second set of rollers 24, 26 can include any number of different configurations.

Thus, the configuration of the first and second sets of rollers 20, 22, 24, 26 illustrated by FIG. 1 is only one implementation of a system for continuously stretching an un-stretched film 10. For example, in alternative implementations the un-stretched film 10 can pass through first and second sets of nip rollers running at differing speeds. Indeed, many conventional MDO systems may be implemented to continuously stretch films in accordance with implementations of the present invention, so long as such systems are capable of stretching the films under cold conditions to draws of less than about 1.8.

As alluded to earlier, the MD tear resistance of the MD continuously-stretched film 30 can be substantially equal to the MD tear resistance of the un-stretched film 10. Indeed, the MD tear resistance of the MD continuously-stretched film 30 can be substantially equal to the MD tear resistance of the un-stretched film 10 despite a reduction in gauge. Furthermore, in one or more implementations, the MD tear resistance of the MD continuously-stretched film 30 can be greater than or equal to the TD tear resistance of the un-stretched film 10. The following examples present the results of a series of tests performed on thermoplastic films that were continuously stretched in the machine direction in accordance with one or more implementations of the present invention. These examples illustrate the invention claimed herein and should not be construed to limit in any way the scope of the invention.

Example 1

In a first example, a thermoplastic film was MD continuously stretched using a process similar to that described herein above at various different draw ratios. The film was a LLDPE having a starting gauge of 0.60 mils. The first set of rollers was set at a speed of 300 feet per minute, while the second set of rollers varied according to the draw ratios indicated in Table I below. The thermoplastic film was continuously stretched in the machine direction under cold or ambient conditions at seven different draw ratios. Specifically, the film was MD continuously stretched at draw ratios of 1.05, 1.15, 1.20, 1.40, 1.50, 1.80, and 2.5. Table I lists the physical properties of these films along with the physical properties of the un-stretched control film (i.e., draw ratio of 1.0).

TABLE I

Physical Properties

| Draw Ratio | MD Tear (grams) | MD Tear relative to un-stretched film (%) | TD Tear (grams) | TD Tear relative to un-stretched film (%) | GBW relative to un-stretched film (%) | Actual Gauge (mils) |
|---|---|---|---|---|---|---|
| 1.0 | 293 | 100.0 | 593 | 100.0 | 100.0 | 0.600 |
| 1.05 | 295 | 100.7 | 521 | 87.9 | 100.1 | 0.601 |
| 1.15 | 263 | 89.8 | 520 | 87.7 | 100.1 | 0.601 |
| 1.20 | 274 | 93.5 | 674 | 113.7 | 102.1 | 0.612 |
| 1.40 | 261 | 89.1 | 690 | 116.4 | 96.3 | 0.578 |
| 1.50 | 286 | 97.6 | 720 | 121.4 | 97.2 | 0.583 |
| 1.80 | 277 | 94.5 | 684 | 115.3 | 91.9 | 0.551 |
| 2.5 | 172 | 58.7 | 466 | 78.6 | 73.8 | 0.443 |

The results from Table I indicate that the MD continuously-stretched film under certain conditions can has a maintained MD tear resistance compared to the un-stretched film. Specifically, the results from Table I indicate that the MD tear resistance is substantially maintained (i.e., at least about 75 percent of the MD tear resistance of the un-stretched film) at draw ratios up to about 1.8. More particularly, Table I indicates that the MD tear resistance is maintained (i.e., at least about 90 percent of the MD tear resistance of the un-stretched film) at draw ratios up to about 1.8.

Indeed, Table I indicates that the MD continuously-stretched film can have an MD tear resistance between about 85 and about 100 percent of the MD tear resistance of the un-stretched film. Table I further illustrates that the MD continuously-stretched film can include a maintained MD tear resistance despite a reduction in gauge. One will appreciate in light of the disclosure herein that this is an unexpected result, as MD tear is expected to decrease as the gauge of the film decreases.

Additionally, the results from Table I indicate that the MD continuously-stretched film under certain conditions can have a maintained or increased TD tear resistance compared to the un-stretched film. Specifically, the results from Table I indicate that the TD tear resistance is substantially maintained or increased at draw ratios up to about 1.8. Indeed, Table I indicates that the MD continuously-stretched film can have a TD tear resistance between about 87 and about 121 percent of the TD tear resistance of the un-stretched film.

Table I further illustrates that the MD tear resistance significantly drops when the un-stretched film is stretched using draw ratios greater than about 1.8. For example, at a draw ratio of about 2.5 the MD tear resistance drops to 58.7 percent of the MD tear resistance of the un-stretched film.

Table I also includes data regarding the gauge-by-weight ("GBW") of the MD continuously-stretched films. In particular, Table I shows that at draw ratios of less than about 1.8, the MD tear resistance percent change relative to un-stretched film is approximately equal to the GBW percent change relative to un-stretched film. This is in contrast to the draw ratio of 2.5 in which the MD tear relative to un-stretched film is significantly less than the GBW relative to un-stretched film.

Example 2

In a second example, a thermoplastic film was MD continuously stretched using a process similar to that described herein above at various different draw ratios. The film was a LLDPE having a starting gauge of 1.20 mils. The first set of rollers was set at a speed of 300 feet per minute, while the second set of rollers varied according to the draw ratios indicated in Table II below. The thermoplastic film was MD continuously stretched under cold or ambient conditions at four different draw ratios. Specifically, the film was MD continuously stretched at draw ratios of 1.20, 1.40, 1.60, and 1.80. Table II lists the physical properties of these films along with the physical properties of the un-stretched control film (i.e., draw ratio of 1.0).

TABLE II

Physical Properties

| Draw Ratio | MD Tear (grams) | MD Tear relative to un-stretched film (%) | TD Tear (grams) | TD Tear relative to un-stretched film (%) | GBW relative to un-stretched film (%) | Actual Gauge (mils) |
|---|---|---|---|---|---|---|
| 1 | 352 | 100.0 | 720 | 100.0 | 100.0 | 1.20 |
| 1.2 | 307 | 87.2 | 739 | 102.6 | 91.3 | 1.10 |
| 1.4 | 349 | 99.1 | 792 | 110.0 | 89.1 | 1.07 |
| 1.6 | 332 | 94.3 | 861 | 119.6 | 84.3 | 1.01 |
| 1.8 | 351 | 99.7 | 998 | 138.6 | 79.0 | 0.95 |

The results from Table II indicate that the MD continuously-stretched film in accordance with one or more implementations of the present invention have a maintained MD tear resistance compared to the un-stretched film. Specifically, the results from Table II indicate that the MD tear resistance is maintained (i.e., at least about 90 percent of the MD tear resistance of the un-stretched film) at draw ratios up to about 1.8.

Indeed, Table I indicates that the MD continuously-stretched film can have an MD tear resistance between about 87 and about 100 percent of the MD tear resistance of the un-stretched film. Table II further illustrates that the MD continuously-stretched films can include a maintained MD tear resistance despite a reduction in gauge. One will appreciate in light of the disclosure herein that this is an unexpected result, as MD tear is expected to decrease as the gauge of the film decreases.

Additionally, the results from Table II indicate that the MD continuously-stretched film can have a maintained or increased TD tear resistance compared to the un-stretched film. Specifically, the results from Table II indicate that the TD tear resistance is substantially maintained or increased at draw ratios up to about 1.8. Indeed, Table II indicates that the MD continuously-stretched film can have a TD tear resistance between about 102 and about 140 percent of the TD tear resistance of the un-stretched film.

One will appreciate in light of the disclosure herein that the MD continuously-stretched films with maintained MD tear resistance can form part of any type of product made from, or incorporating, thermoplastic films. For instance, grocery bags, trash bags, sacks, packaging materials, feminine hygiene products, baby diapers, adult incontinence products, sanitary napkins, bandages, food storage bags, food storage containers, thermal heat wraps, facial masks, wipes, hard surface cleaners, and many other products can include MD continuously-stretched films 30 with maintained MD tear resistance to one extent or another. Trash bags and food storage bags may be particularly benefited by the films of the present invention.

Figure 2:
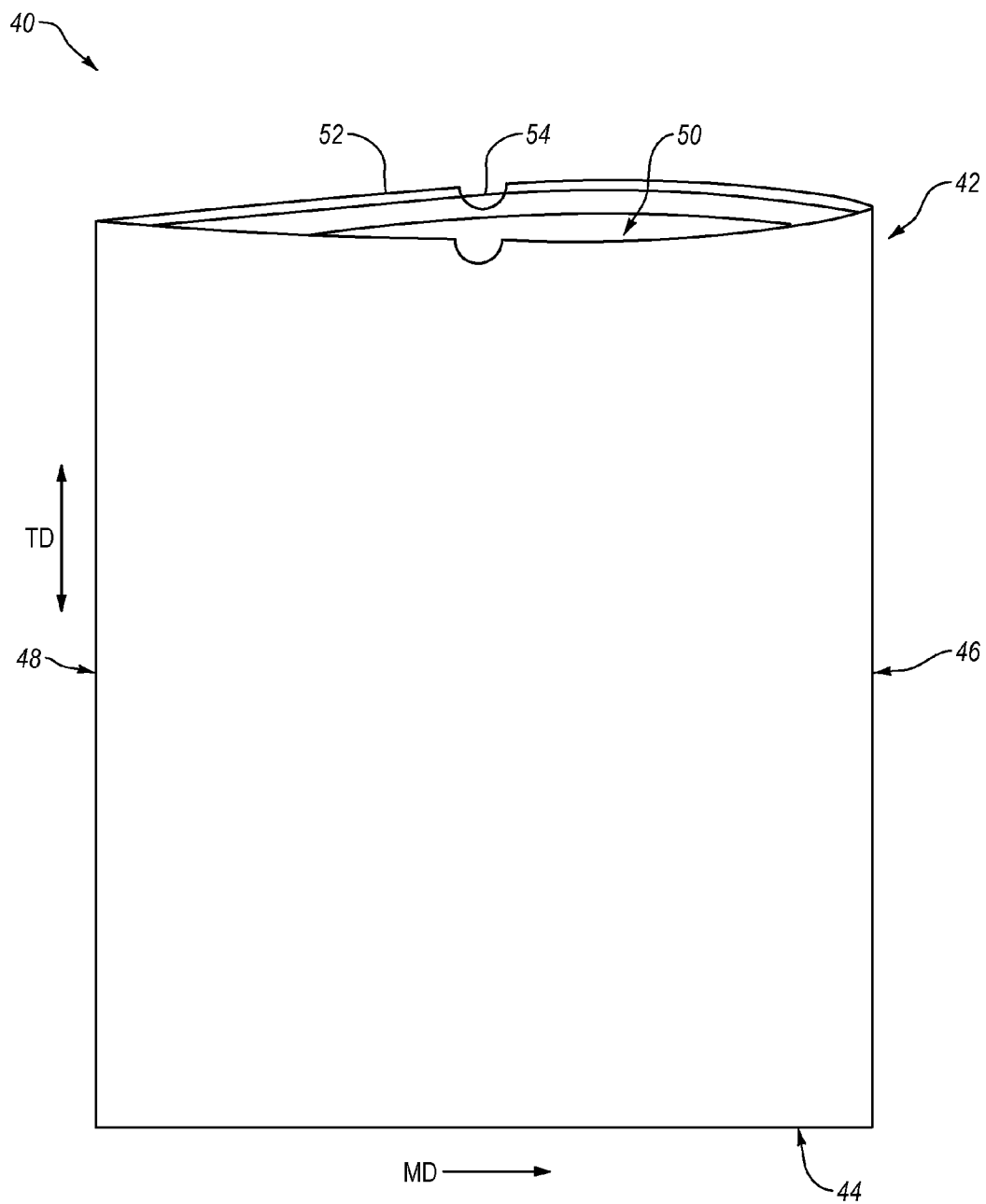
FIG. 2 illustrates a bag incorporating a machine direction stretched film in accordance with one or more implementations of the present invention.

Referring to FIG. 2, in a particular implementation of the present invention, the MD continuously-stretched film 30 illustrated in FIG. 1 may be incorporated in a bag construction, such as a flexible draw tape bag 40. The flexible draw tape bag 40 can include a bag body 42 having one or more side walls formed from a piece of MD continuously-stretched film 30 folded upon itself along a bag bottom 44. Side seams 46 and 48 can bond the sides of the bag body 42 together to form a semi-enclosed container having an opening 50 along an upper edge 52. The flexible draw tape bag 40 also optionally includes closure means 54 located adjacent to the upper edge 52 for sealing the top of the bag 40 to form a fully-enclosed container or vessel. The flexible draw tape bag 40 is suitable for containing and protecting a wide variety of materials and/or objects. The closure means 54 can comprise flaps, adhesive tapes, a tuck and fold closure, an interlocking closure, a slider closure, a zipper closure or other closure structures known to those skilled in the art for closing a bag.

The flexible draw tape bag 40 can require less material to form than an identical bag formed with an un-stretched film 10 of the same thermoplastic material. Additionally, despite requiring less material, the flexible draw tape bag 40 can have the approximately same MD tear resistance as an identical bag formed with an un-stretched film 10 of the same thermoplastic material. The maintained MD tear resistance can help prevent the flexible draw tape bag 40 from tearing and losing the contents.

Figure 3:
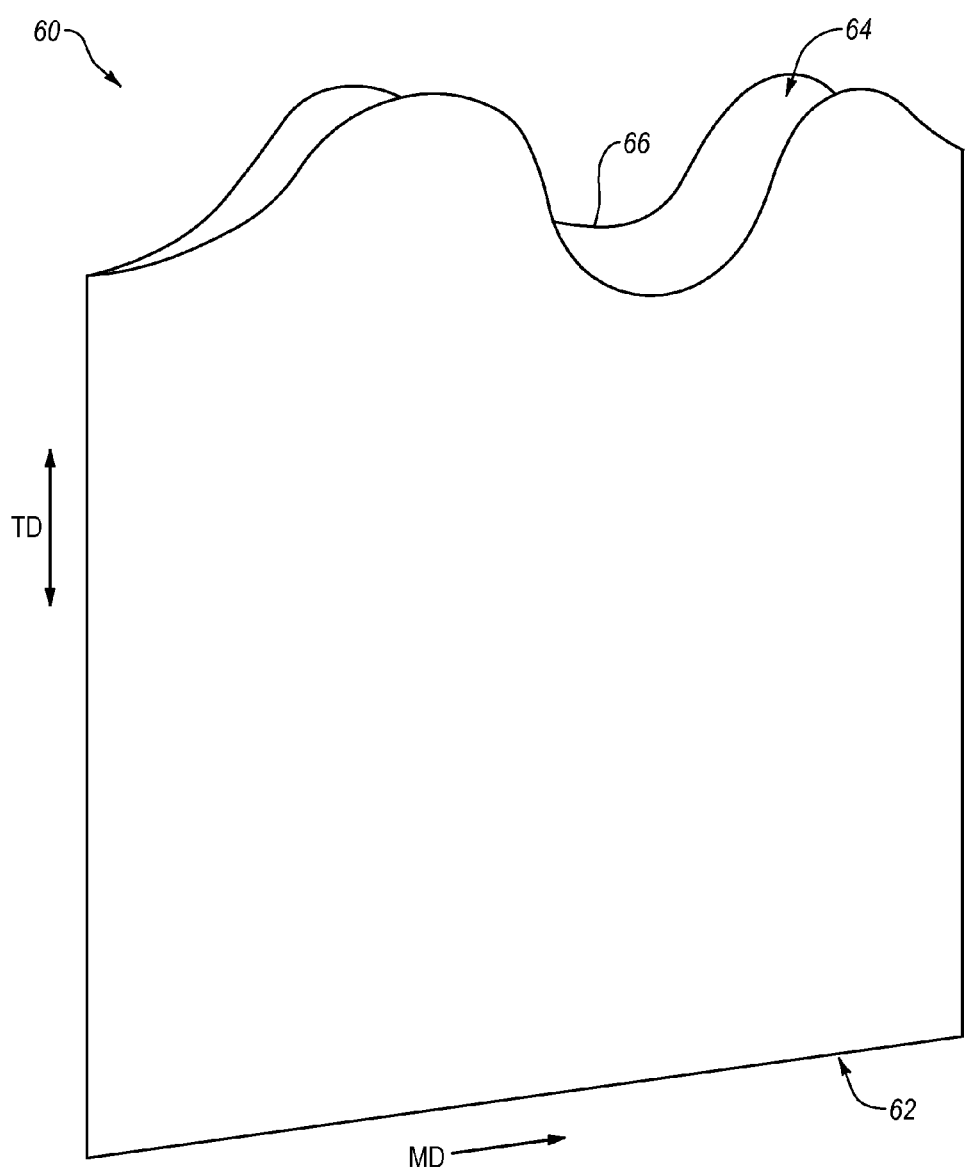
FIG. 3 illustrates another bag incorporating a machine direction stretched film in accordance with one or more implementations of the present invention.

FIG. 3 illustrates a tie bag 60 incorporating an MD continuously-stretched film 30 in accordance with an implementation of the present invention. The tie bag 60 can include sides walls formed from a piece of MD continuously-stretched film 30 folded upon itself along a bag bottom 62. In comparison with the flexible draw tape bag 40 of FIG. 2, the tie bag 60 can include flaps along the upper edge 66. The flaps can allow a user to close off an opening 64 of the tie bag 60. Similar to flexible draw tape bag 40, the tie bag 60 can require less material to form than an identical bag formed with an un-stretched film 10 of the same thermoplastic material. Additionally, despite requiring less material, the tie bag 60 can have the approximately same MD tear resistance as an identical bag formed with an un-stretched film 10 of the same thermoplastic material.

As mentioned, the bags 30, 40 can include a bag body having one or more side walls formed from a piece of MD continuously-stretched film 30. In one or more implementations, the bag 30, 40 include a first sidewall formed from an MD continuously-stretched film 30. The first side wall can include a relatively uniform or consistent gauge. In one or more implementations, the second, opposing side wall can include one or more ribs, stripes, or otherwise non-planar elements. In other words, the second, opposing side wall can include have a gauge that varies. For example, the second, opposing side wall can comprise ribs extending across the side wall. Such ribs can be formed by a machine-direction, transverse direction, and/or diagonal direction ring rolling process. Thus, the ribs can comprise alternating thicker and thinner strips. Such ribs can extend across the sidewall in the machine direction, the transverse direction, and/or a diagonal direction. Alternatively, or additionally, the non-planar elements can comprise raised rib-like elements formed by a structural elastic like film (SELF) process. Such raised rib-like elements can be arranged in patterns, such as circles, squares, diamonds, hexagons, or other polygons and shapes.

Figure 4:
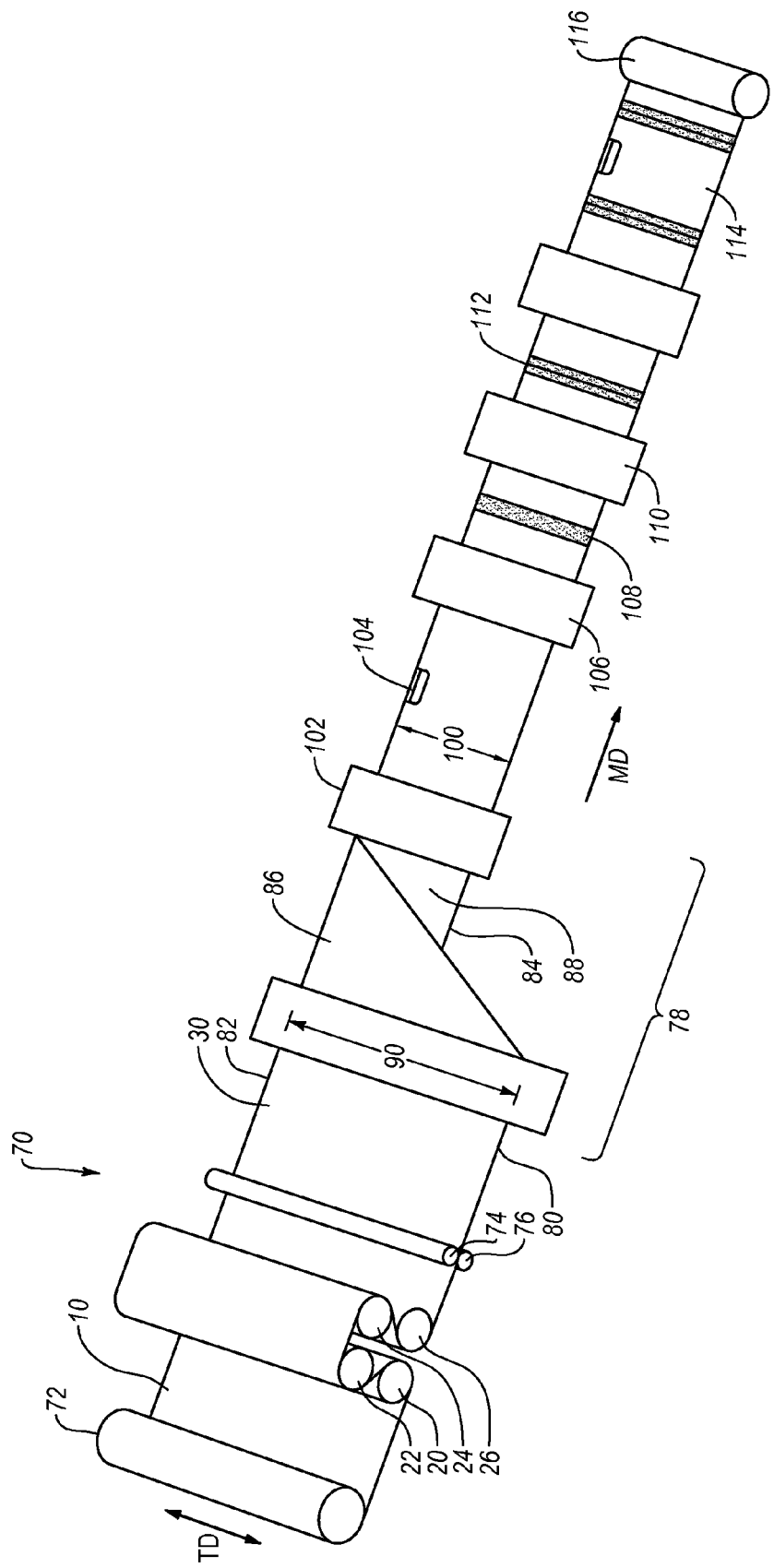
FIG. 4 illustrates a schematic diagram of a bag manufacturing process in accordance with one or more implementations of the present invention.

FIG. 4 illustrates an exemplary embodiment of a high-speed manufacturing process 70 for continuously stretching a thermoplastic film in the machine direction and producing a plastic bag there from. According to the process 70, an un-stretched film 10 is unwound from roll 72 and directed along a machine direction. The un-stretched film 10 can pass about a first set of rollers 20, 22 and a second set of rollers 24, 26 to continuously stretch the un-stretched film 10 in the machine direction. In one or more implementations, the first set of rollers 20, 22 and a second set of rollers 24, 26 are not heated and the un-stretched film 10 is stretched under cold or ambient conditions.

The first and second sets of rollers 20, 22, 24, 26 can have a construction similar to that shown in FIG. 1. The first set of rollers 20, 22 can rotate at a first velocity, and the second set of rollers 24, 26 can rotate at a velocity between about 1.1 and about 1.8 times greater than the velocity of the first set of rollers 20, 22. In various implementations, motors may be provided that power rotation of the rollers 20, 22, 24, 26 in a controlled manner. The velocity difference between the first and second sets of the rollers can continuously stretch the un-stretched film 10 to create an MD continuously-stretched film 30.

During the manufacturing process 70, the MD continuously-stretched film 30 can pass through a pair of pinch rollers 74, 76. The pinch rollers 74, 76 can grasp the MD continuously-stretched film 30. The pinch rollers 74, 76 may facilitate and accommodate the MD continuously-stretched film 30.

A folding operation 78 can fold the MD continuously-stretched film 30 to produce the sidewalls of the finished bag. The folding operation 78 can fold the MD continuously-stretched film 30 in half along the transverse direction. In particular, the folding operation 78 can move a first edge 80 adjacent to the second edge 82, thereby creating a folded edge 84. The folding operation 78 thereby provides a first film half 86 and an adjacent second web half 88. The overall width 100 of the second film half 88 can be half of the width 90 of the pre-folded MD continuously-stretched film 30.

To produce the finished bag, the processing equipment may further process the folded MD continuously-stretched film 30. In particular, a draw tape operation 102 can insert a draw tape 104 into the MD continuously-stretched film 30. Furthermore, a sealing operation 106 can form the parallel side edges of the finished bag by forming heat seals 108 between adjacent portions of the MD continuously-stretched film 30. The sealing operation 106 can space the heat seals 108 along the folded MD continuously-stretched film 30. The sealing operation 106 can form the heat seals 108 using a heating device, such as, a heated knife.

A perforating operation 110 may form a perforation 112 in the heat seals 108 using a perforating device, such as, a perforating knife. The perforations 112 in conjunction with the folded outer edge 84 can define individual bags 114 that may be separated from the MD continuously-stretched film 30. A roll 116 can wind the MD continuously-stretched film 30 embodying the finished bags 114 for packaging and distribution. For example, the roll 116 may be placed into a box or bag for sale to a customer.

In still further implementations, the folded MD continuously-stretched film 30 may be cut into individual bags along the heat seals 108 by a cutting operation. In another implementation, the folded MD continuously-stretched film 30 may be folded one or more times prior to the cutting operation. In yet another implementation, the side sealing operation 106 may be combined with the cutting and/or perforation operations 110.

Figure 5:
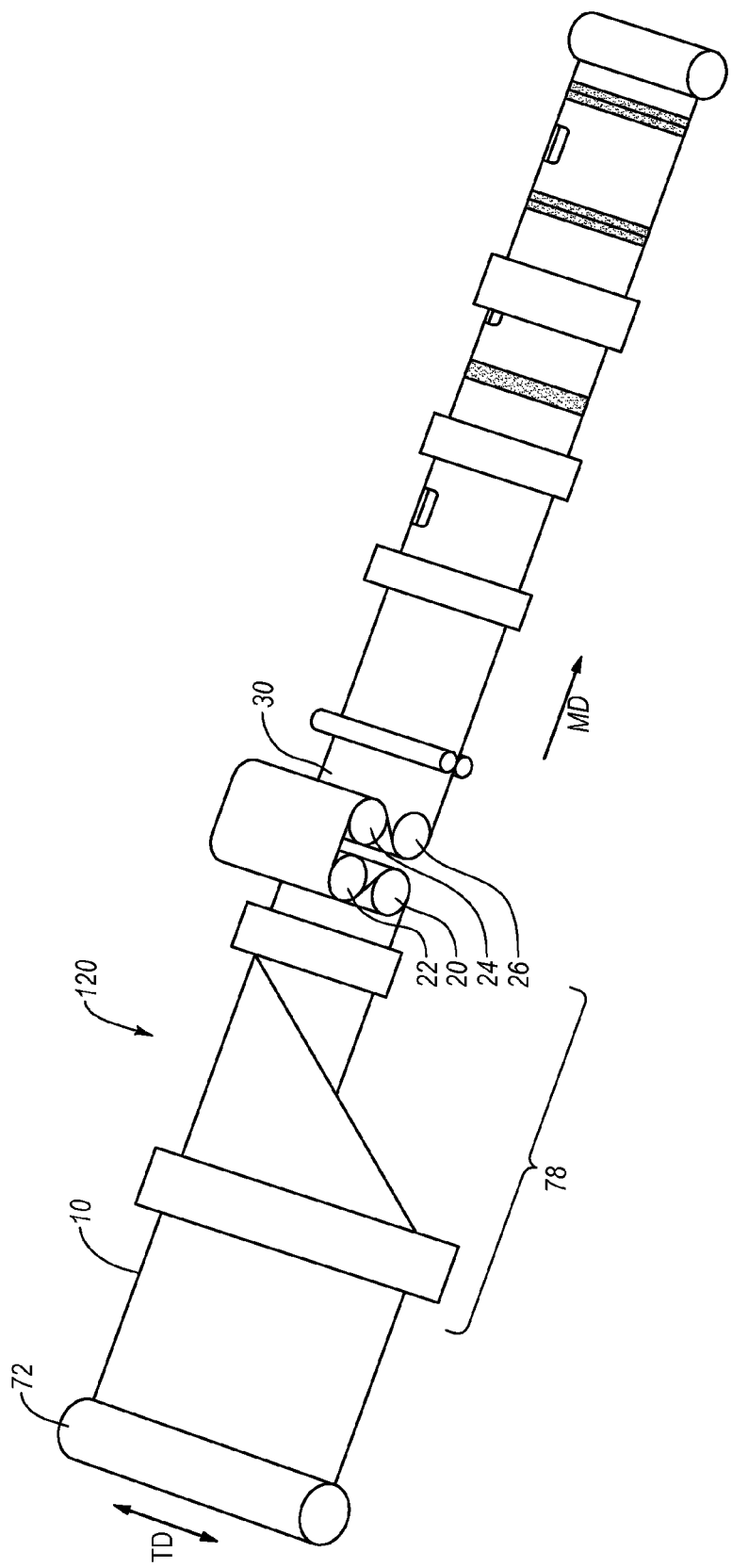
FIG. 5 illustrates a schematic diagram of another bag manufacturing process in accordance with one or more implementations of the present invention.

One will appreciate in light of the disclosure herein that the process 70 described in relation to FIG. 4 can be modified to omit or expanded acts, or vary the order of the various acts as desired. For example, FIG. 5 illustrates another manufacturing process 120 for producing a plastic bag from an MD continuously-stretched film 30. The process 120 can be similar to process 70 of FIG. 4, except that the un-stretched film 10 is stretched by the first and second sets of rollers 20, 22, 24, 26 to form the MD continuously-stretched film 30 after the folding operation 78 has folded the un-stretched film 10 in half.

Figure 6:
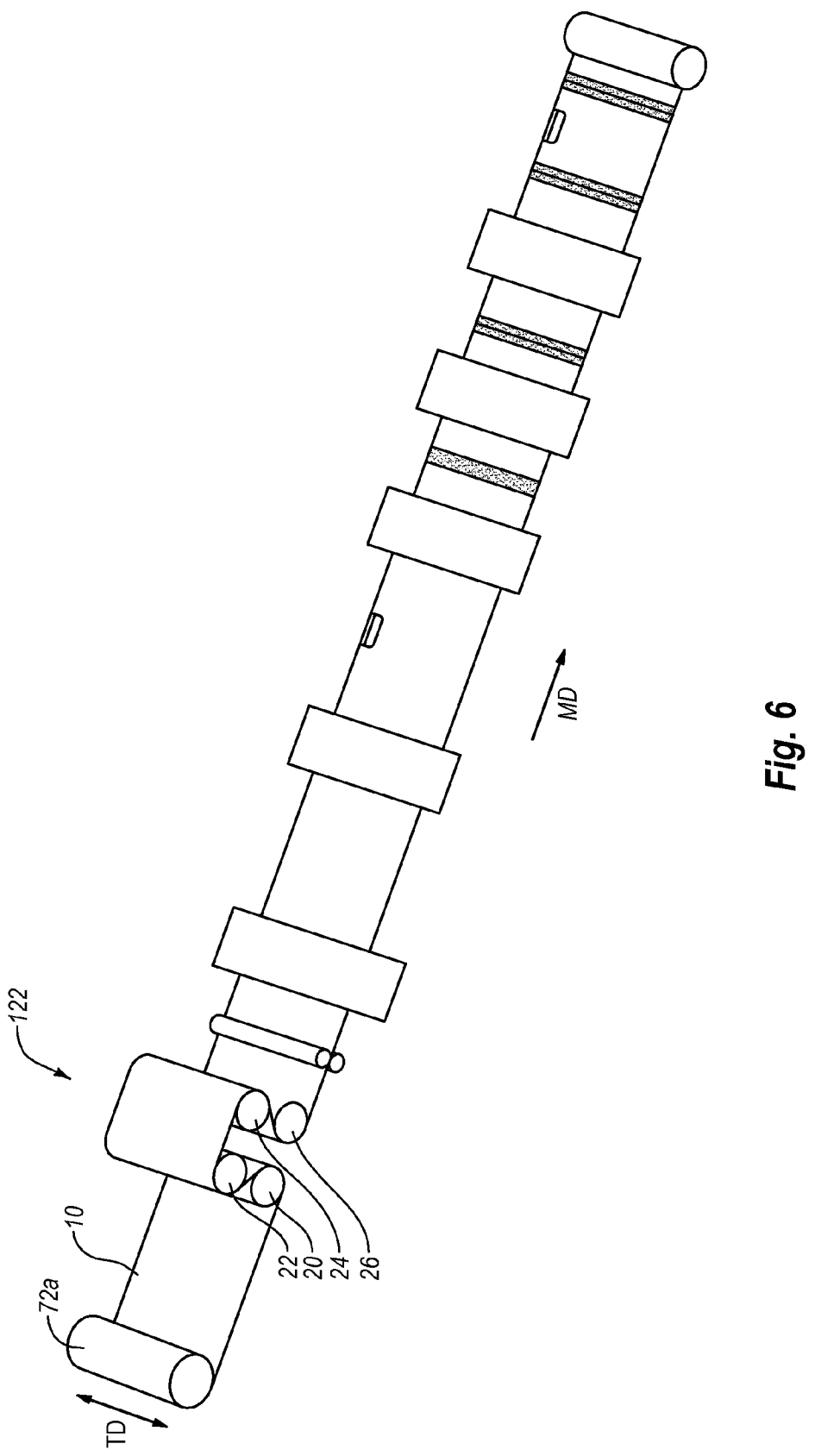
FIG. 6 illustrates a schematic diagram of yet another bag manufacturing process in accordance with one or more implementations of the present invention.

FIG. 6 illustrates yet another manufacturing process 122 for producing a bag from an MD continuously-stretched film 30. The process 122 can be similar to process 70 of FIG. 4, except that the un-stretched film 10 is folded prior to winding it on the roll 72a. Thus, in such implementations, the un-stretched film 10 unwound from the roll 72a is already folded.

Implementations of the present invention can also include methods of continuously stretching a film of thermoplastic material in the machine direction while at least substantially maintaining the machine-direction tear resistance of the film. The following describes at least one implementation of a method with reference to the components and diagrams of FIGS. 1 through 6. Of course, as a preliminary matter, one of ordinary skill in the art will recognize that the methods explained in detail herein can be modified to install a wide variety of configurations using one or more components of the present invention. For example, various acts of the method described can be omitted or expanded, and the order of the various acts of the method described can be altered as desired.

For instance, one method in accordance with one or more implementations of the present invention can include providing a film of a thermoplastic material with a first machine-direction tear resistance. For example, the method can involve extruding an un-stretched film 10 and directing the un-stretched film 10 into a high speed manufacturing system. The un-stretched film 10 of thermoplastic material can have a first MD tear resistance. In some implementations, the un-stretched film 10 can have a substantially uniform starting gauge 16.

The method can also include cold stretching the film continuously in the machine direction at a draw less than about 80 percent. In one or more implementations this can involve passing the un-stretched 10 sequentially through a first set of rollers 20, 22 rotating at a first velocity and a second set of rollers 24, 26 rotating at a second velocity. The second velocity can be between about 1.1 and 1.8 times greater than the first velocity. The first set of rollers 20, 22 and the second set of rollers 24, 26 can continuously stretch the un-stretched film 10 in the machine direction to form an MD continuously-stretched film 30. The MD continuously-stretched film 30 can have a second machine-direction tear resistance that is at least about 75 percent of the first machine-direction tear resistance of the un-stretched film 10.

Accordingly, FIGS. 1-6 and the corresponding text specifically show, describe, or otherwise provide a number of systems, components, apparatus, and methods for stretching a film in the machine direction. These apparatus and methods can stretch films while at least substantially maintaining the film's MD tear resistance. There are several advantages associated with MD continuously stretching a thermoplastic film in accordance with one or more implementations of the present invention. First, MD continuously a film can reduce the amount of thermoplastic material needed to produce a film of certain dimensions. Manufacturers can decrease the cost of their products if they use less thermoplastic material in their products. Depending on the amount that a film is stretched, this cost savings can be significant.

Second, if a thermoplastic film is continuously stretched in the machine direction in accordance with one or more implementations of the present invention, the film's MD tear resistance can be maintained. This finding is unexpected, as it is generally understood that MD stretching a thermoplastic film will decrease the film's MD resistance to tear (i.e., make the film more susceptible to MD tear). Indeed, in one or more implementations the MD tear resistance of a thermoplastic film can be maintained despite the reduction in gauge. In one or more implementations, the MD tear resistance of the MD continuously-stretched film 30 can be approximately equal to the MD tear resistance of the un-stretched film 10.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method for stretching a film of thermoplastic material in a machine direction while substantially maintaining a machine-direction tear resistance of the film, comprising:
   providing an un-stretched blown, linear low-density polyethylene thermoplastic film continuously oriented in a machine direction and having a machine-direction tear resistance; and
   cold stretching the un-stretched film continuously in the machine direction at a draw less than about 80 percent;
   wherein the continuously stretched film has a machine-direction tear resistance that is at least about 75 percent of the machine-direction tear resistance of the un-stretched film; and
   a transverse-direction tear resistance that is increased compared to a transverse-direction tear resistance of the un-stretched film.

2. The method as recited in claim 1, wherein stretching the film continuously in the machine direction comprises:
   passing the film sequentially through a first set of rollers rotating at a first velocity and a second set of rollers rotating at a second velocity; and
   the second velocity is between about 1.1 and about 1.8 times greater than the first velocity.

3. The method as recited in claim 2, wherein the first set of rollers and the second set of rollers are arranged so the film follows an s-shaped path when passing through both the first set of rollers and the second set of rollers.

4. The method as recited in claim 1, wherein the continuously stretched film has an average gauge less than a starting gauge of the film of the thermoplastic material.

5. The method as recited in claim 1, wherein the transverse-direction tear resistance of the continuously stretched film is between 100.1 percent and about 140 percent of the transverse-direction tear resistance of the un-stretched film.

6. The method as recited in claim 1, further comprising forming the continuously stretched film into a trash bag.

7. The method as recited in claim 6, further comprising inserting a draw tape into the trash bag.

8. The method as recited in claim 1, wherein a ratio of the machine direction tear resistance of the continuously stretched film to the machine-direction tear resistance of the un-stretched film is approximately equal to a ratio of the gauge-by-weight of the continuously-stretched film to the gauge-by-weight of the un-stretched film.

9. The method as recited in claim 3, wherein:
passing the film through the first set of rollers comprises passing the film counter clockwise about a first roller of the first set of rollers and clockwise about a second roller of the first set of rollers; and
passing the film through the second set of rollers comprises passing the film clockwise about a first roller of the second set of rollers and counter-clockwise about a second roller of the second set of rollers.

10. A method for increasing area of thermoplastic films without degrading a machine-direction tear resistance of the thermoplastic films, comprising:
providing an initial blown, linear low-density polyethylene thermoplastic film continuously oriented in a machine direction and having a machine-direction tear resistance; and
cold stretching the initial film continuously in the machine direction at a draw less than about 80 percent such that:
the continuously stretched film has a machine-direction tear resistance that is at least 75 percent of the machine-direction tear resistance of the initial film;
the continuously stretched film has a transverse-direction tear resistance that is at least 87% of a transverse-direction tear resistance of the initial film; and
a gauge-by-weight that is less than a gauge-by-weight of the initial film.

11. The method as recited in claim 10, wherein the machine-direction tear resistance of the continuously stretched film is between about 85 percent and 100 percent of the machine-direction tear resistance of the initial film.

12. The method as recited in claim 11, wherein the machine-direction tear resistance of the continuously stretched film is between about 90 percent and 100 percent of the machine-direction tear resistance of the initial film.

13. The method as recited in claim 10, wherein the transverse-direction tear resistance of the continuously stretched film is between 87 and 140 percent the transverse-direction tear resistance of the initial film.

14. The method as recited in claim 13, wherein the transverse-direction tear resistance of the continuously stretched film is between 100 and 140 percent of the transverse-direction tear resistance of the initial film.

15. The method as recited in claim 10, wherein the gauge-by-weight of the continuously stretched film is between about 80 and about 90 percent of the gauge-by-weight of the initial film.

16. The method as recited in claim 10, wherein stretching the film continuously in the machine direction comprises:
passing the film sequentially through a first set of rollers rotating at a first velocity and a second set of rollers rotating at a second velocity; and
the second velocity is between about 1.1 and about 1.8 times greater than the first velocity.

17. The method as recited in claim 16, wherein the first set of rollers and the second set of rollers are arranged so the film follows an s-shaped path when passing through both the first set of rollers and the second set of rollers.

18. The method as recited in claim 17, wherein:
passing the film through the first set of rollers comprises passing the film counter clockwise about a first roller of the first set of rollers and clockwise about a second roller of the first set of rollers; and
passing the film through the second set of rollers comprises passing the film clockwise about a first roller of the second set of rollers and counter-clockwise about a second roller of the second set of rollers.

19. The method as recited in claim 10, further comprising forming the continuously stretched film into a trash bag.

20. The method as recited in claim 19, further comprising inserting a draw tape into the trash bag.

* * * * *